Patented Nov. 30, 1948

2,454,936

UNITED STATES PATENT OFFICE 2,454,936

PROCESS FOR PREPARING UNSATURATED ALCOHOLS

Glen H. Morey, Terre Haute, Ind., assignor to Commercial Solvents Corporation, Terre Haute, Ind., a corporation of Maryland No Drawing. Application January 22, 1944, Serial No. 519,346

3 Claims. (Cl. 260—642)

This invention relates to the preparation of aliphatic unsaturated monohydric alcohols, and more particularly to a method for preparing such alcohols by the controlled dehydration of saturated dihydric aliphatic alcohols having a single tertiary hydroxyl group.

The invention relates more particularly to the partial dehydration of saturated diols having the following structural formula:

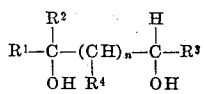

in which $R^1$ and $R^2$ are alkyl radicals, $R^3$ and $R^4$ are hydrogen or alkyl radicals and $n$ is an integer from 1 to 4 inclusive. In this formula it will be observed that the hydroxyl (OH) group at the left-hand side of the formula is that of a tertiary alcohol being attached to a tertiary carbon atom, that is, to a carbon atom which is linked to three other carbon atoms. The hydroxyl on the right side of the formula is either secondary, when $R^3$ is alkyl, that is, on a carbon atom attached to two other carbon atoms, or primary, when $R^3$ is hydrogen, that is, on a carbon atom attached to only one other carbon atom.

Aliphatic dihydric alcohols of the class described have been subjected to dehydration in the past, with the loss of both hydroxyls as water to form unsaturated compounds (dienes) and their dimers as the major products of the reaction. For example, dehydration of 2-methyl-2,4-pentanediol by the process of my copending application, Serial No. 423,576, filed August 31, 1942 and now abandoned, and Patent No. 2,368,068 dated January 23, 1945, results in the formation primarily of 2-methylpentadiene in one case and primarily of dimers of 2-methylpentadiene in the other case.

It is an object of the present invention to prepare unsaturated aliphatic monohydric alcohols form dihydric alcohols having a single tertiary hydroxyl group and another hydroxyl group which is either primary or secondary.

A further object is to provide a process for the partial dehydration of such dihydric alcohols, whereby the tertiary hydroxyl group is removed, while the primary or secondary hydroxyl group remains for the the most part unchanged in the molecule after the partial dehydration.

A still further object is to prepare isomeric unsaturated, monohydric alcohols of the following probable structural formulas:

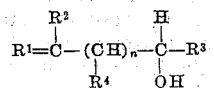

and

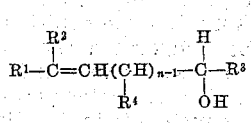

in which $R^1$ and $R^2$ are alkyl radicals, $R^3$ and $R^4$ are hydrogen or alkyl radicals, and $n$ is an integer from 1 to 4 inclusive.

Another object is to provide a process for the partial dehydration of the dihydric alcohols described in which the resulting product comprises a greatly preponderant proportion of unsaturated monohydric alcohol, and a minor proportion of the diene.

A still further object is to provide a process for preparing 4-methylpentene-2-ol by controlled dehydration of 2-methyl-2,4-pentanediol.

Other objects will be apparent from the specification and claims.

In my copending application, Serial No. 519,345, filed Jan. 22, 1944, and now abandoned, I have described a method for preparing unsaturated alcohols from diols by controlled dehydration of the diol utilizing p-toluenesulfonic acid as the dehydrating catalyst. This treatment resulted in the formation of a mixture of the unsaturated alcohol and the diene, with the unsaturated alcohol present in a somewhat larger proportion than the diene.

I have now found that I can prepare the type of unsaturated alcohols described, by controlled dehydration of the diols according to an improved process in which the unsaturated alcohol is formed in a greatly preponderant amount while the diene is formed in very much lesser quantities down to rather insignificant amounts.

According to my present invention, I utilize any of the previously known dehydrating agents which do not tend to polymerize the resulting product, that is, I may utilize the p-toluenesulfonic acid of my acknowledged copending application, or the iodine dehydrating compounds of my Patent No. 2,368,068. The improvement in procedure resulting in the surprisingly increased yields comprises first adding a small proportion of water to the diol before starting the dehydration step. A dehydration catalyst is then added, and the mixture is distilled. The oil layer of the distillate is drawn off while continuously returning the water layer to the distillation vessel.

The amount of water added may be relatively small, just sufficient to insure control of the dehydration in the initial stages, as water is formed as a reaction product of the process. If too large an initial amount is added, the reaction is slowed down and requires a longer period to go to completion. I therefore prefer to add not over about 20% of water, preferably less than 10% by weight, based on the weight of the diol used.

The dehydrating agents which are suitable for use in my improved process are p-toluenesulfonic acid, iodine, aniline hydroiodide, and hydrogen iodide. Only a very small percentage is sufficient to catalyze the dehydration about 0.1% to 1.5% by weight, based on the weight of the diol being required.

In practicing my invention, I add to the dihydric alcohol to be dehydrated a small but effective percentage of water, place the mixture in a distillation vessel in the presence of a relatively small proportion of dehydration catalyst, and heat so that the material distills rapidly. The product which distills consists of a greatly preponderant portion of the unsaturated alcohol with a minor portion of the diene.

It is surprising that the addition of water to a product to be dehydrated should improve the dehydration process. Although it is not known just what function the water plays, it is possible that its effect is such as to inhibit the dehydration of the primary and secondary hydroxyl group, but insufficient to inhibit the dehydration of the tertiary hydroxyl group which occurs more easily. Whatever the explanation may be, my improved process enables me to obtain mixtures of unsaturated alcohol and diene in which the proportion of alcohol greatly predominates, ranging from twice as much alcohol as diene to four times or more the amount of alcohol to diene.

As illustrative of my invention, the following examples are given:

EXAMPLE I

*Iodine as catalyst*

2740 parts by weight of 2-methyl-2,4-pentanediol (23.2 moles) are mixed with 200 parts by weight of water and 4 parts by weight of iodine are added. The material is distilled in an apparatus whereby the oil layer in the distillate is collected and the water layer is continuously returned to the kettle. The oil layer is fractionated, resulting in yields of products as follows:

|  | Per cent |
|---|---|
| 2-methylpentadiene | 26.7 |
| 4-methylpentene-2-ol | 51.0 |
| Dimer of the diene | 3.8 |
| Total | 81.5 |

EXAMPLE II

*p-Toluenesulfonic acid as catalyst*

2740 parts by weight of 2-methyl-2,4-pentanediol and 200 parts by weight of water are placed in a distillation vessel along with 3 parts by weight of p-toluenesulfonic acid. The oil layer of the distillate is collected and the water layer is returned to the kettle. On fractionation of the oil layer, the following yields of products are obtained:

|  | Per cent |
|---|---|
| 2-methylpentadiene | 15.6 |
| 4-methylpentene-2-ol | 60.2 |
| Dimer of the diene | 12.1 |
| Total | 87.9 |

While the above describes the preferred embodiments of my invention, it is to be understood that departures may be made therefrom within the scope of the specification and claims.

What is claimed is:

1. In a process for the preparation of 4-methylpentene-2-ol isomers in proportions of at least twice the quantity of the concomitantly formed dienes, the steps which comprise mixing 2-methyl-2,4-pentanediol with a relatively small but effective percentage proportion of water not substantially exceeding about 10 per cent by weight, adding thereto a dehydration catalyst selected from the group consisting of p-toluenesulfonic acid, iodine, aniline hydroiodide and hydrogen iodide, rapidly distilling the mixture, condensing the distillate whereby a water layer and an oil layer are formed, continuously returning the water layer to the distillation vessel throughout the distillation process, while collecting the oil layer, and recovering the 4-methylpentene-2-ol isomers from the oil layer.

2. In a process for preparing a mixture of organic compounds comprising a greatly preponderant proportion of isomeric monohydric unsaturated alcohols and a lesser proportion of the corresponding dienes, the steps which comprise adding a relatively small but effective percentage of water not substantially exceeding about 10 per cent by weight to an aliphatic dihydric alcohol of the following structural formula:

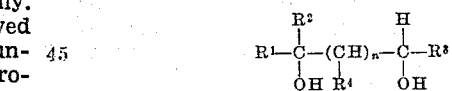

in which $R^1$ and $R^2$ are alkyl radicals, $R^3$ and $R^4$ are selected from the group consisting of hydrogen and alkyl radicals and $n$ is an integer from 1 to 4 inclusive, adding thereto a dehydration catalyst selected from the group consisting of p-toluenesulfonic acid, iodine, aniline hydroiodide and hydrogen iodide, rapidly distilling the mixture, condensing the distillate whereby a water layer and an oil layer are formed, continuously returning the water layer to the distillation vessel throughout the distillation process, while collecting the oil layer, and recovering the isomeric monomeric monohydric unsaturated alcohols.

3. In a process for preparing a mixture of organic compounds comprising a preponderant proportion of monohydric unsaturated alcohols of the following structural formulas:

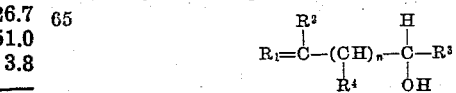

and

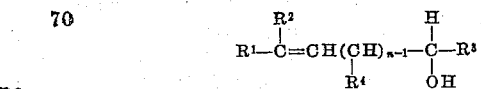

in which $R^1$ and $R^2$ are alkyl radicals, $R^3$ and $R^4$ are selected from the group consisting of hydrogen and alkyl and $n$ is an integer from 1 to 4, inclusive and a lesser proportion of the corresponding dienes, the steps which comprise adding a relatively small but effective percentage of water not substantially exceeding about 10 per cent by weight to an aliphatic dihydric alcohol of the following structural formula:

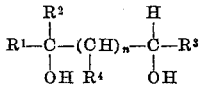

in which $R^1$ and $R^2$ are alkyl radicals, $R^3$ and $R^4$ are selected from the group consisting of hydrogen and alkyl radicals and $n$ is an integer from 1 to 4, inclusive, adding thereto a small proportion of a dehydration catalyst selected from the group consisting of p-toluenesulfonic acid, iodine, aniline hydroiodide, and hydrogen iodide, heating the mixture to distillation temperature, distilling rapidly and condensing the distillate to form a water layer and an oil layer while continuously returning the water layer to the distillation vessel throughout the distillation process, and thereafter recovering the unsaturated alcohols from the distillate.

GLEN H. MOREY.

REFERENCES CITED

The following references are of record in the file of this patent:

UNITED STATES PATENTS

| Number | Name | Date |
|---|---|---|
| Re. 19,194 | Guenther et al. | June 5, 1934 |
| 1,164,647 | Hibbert | Dec. 21, 1915 |
| 2,184,164 | Mueller-Cunradi et al. | Dec. 19, 1939 |
| 2,229,652 | Halbig et al. | Jan. 28, 1941 |

FOREIGN PATENTS

| Number | Country | Date |
|---|---|---|
| 413,909 | Great Britain | July 26, 1934 |
| 421,218 | Great Britain | July 13, 1937 |
| 483,781 | Germany | Oct. 19, 1929 |

OTHER REFERENCES

Duveen et al.: "Chemical Society Journal" (British), 1936, pages 1451-3.

Kyriskides: "J. Am. Chem. Soc.," vol 36, pages 991-7 (1914).

Bachman et al.: "J. Am. Chem. Soc.," vol 64, pages 787-90 (1942).